H. REDLICH.
CLUTCH PEDAL CONTROLLER.
APPLICATION FILED AUG. 31, 1914.

1,176,244.

Patented Mar. 21, 1916.

Witnesses
F. B. Wooden
Marian Moore

H. Redlich
Inventor,
by C. A. Snow & Co.
Attorneys.

UNITED STATES PATENT OFFICE.

HARRY REDLICH, OF JERSEYVILLE, ILLINOIS.

CLUTCH-PEDAL CONTROLLER.

1,176,244.   Specification of Letters Patent.   Patented Mar. 21, 1916.

Application filed August 31, 1914. Serial No. 859,484.

*To all whom it may concern:*

Be it known that I, HARRY REDLICH, a citizen of the United States, residing at Jerseyville, in the county of Jersey and State of Illinois, have invented a new and useful Clutch-Pedal Controller, of which the following is a specification.

The present invention appertains to a controller or dash-pot for the clutch pedals of motor vehicles, and aims to provide a novel and improved appliance of that character.

The invention contemplates the provision of a simple and inexpensive controller which may be readily installed in various automobiles, so as to be attached to the clutch pedal or other movable member of the clutch mechanism, whereby an air cushion will be provided which will prevent the clutch from being thrown in quickly, and to thereby avoid the so called "grabbing" usually incident to the quick action of the clutch.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawing, wherein:—

Figure 1:
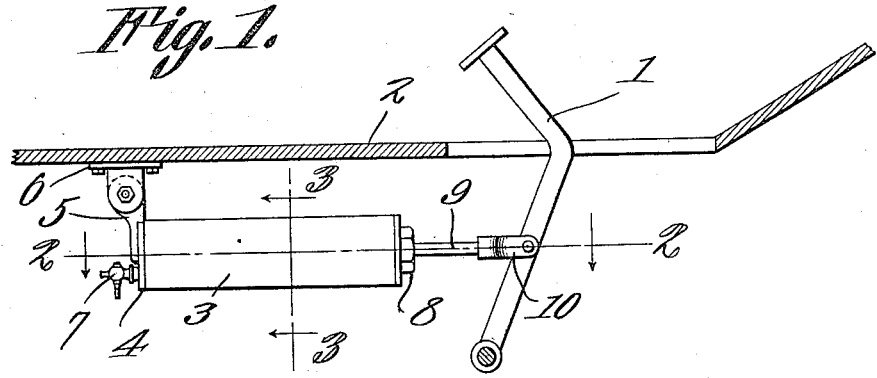
Figure 2:
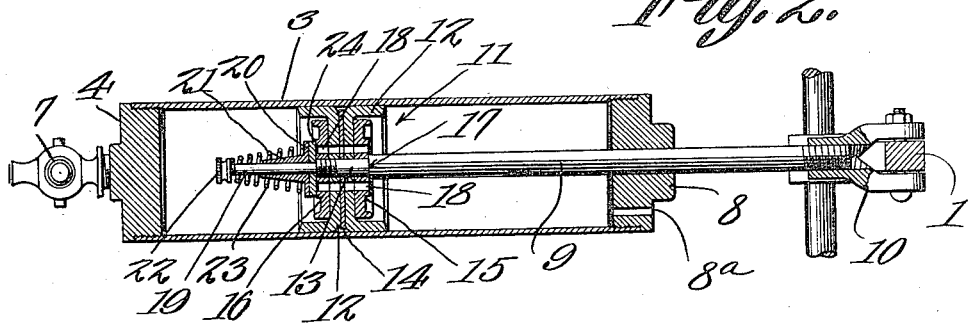
Figure 3:
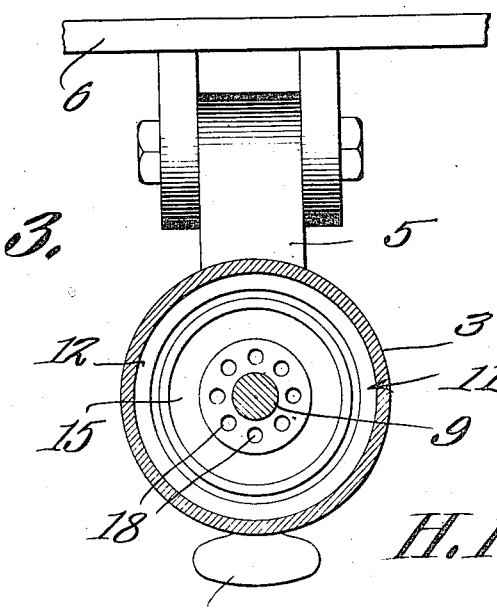

Figure 1 is a side elevation of the device as applied to a clutch pedal. Fig. 2 is an enlarged horizontal section of the device, taken on the line 2—2 of Fig. 1. Fig. 3 is an enlarged cross section of the device, taken on the line 3—3 of Fig. 1.

In the drawing, the numeral 1 designates the clutch pedal of an automobile which works through the floor 2 in the usual manner, the clutch (not shown) being connected to the clutch pedal 1 in such a manner that when the clutch pedal 1 is moved rearwardly under the influence of the clutch spring (not shown), the clutch will be thrown in, and when the pedal 1 is pushed forwardly by the foot of the operator, the clutch will be thrown out or disengaged.

The present invention aims to provide means for retarding or checking the quick return of the clutch pedal 1 after the same has been pushed forwardly to release the clutch and to thereby avoid the "grabbing" action usually incident to a quick throwing in of the clutch.

In carrying out the present invention, there is provided an air cylinder 3 disposed horizontally and longitudinally below the bottom 2 of the car body, and having a head 4 threaded or otherwise engaged into its rear end. The head 4 is provided with an upstanding ear 5 which is pivoted or fulcrumed to a cross bar 6 secured to the sides (not shown) of the motor vehicle chassis or frame underneath the floor 2. This enables the rear end of the cylinder 3 to be readily pivoted to the frame of the motor car. The head 4 of the cylinder 3 is also provided with a pet cock 7 which may be opened at any time to release the compressed air therein when the present device is to be rendered inoperative.

A head 8 is threaded or otherwise engaged into the forward end of the cylinder 3 and is provided with a vent or opening $8^a$ therethrough to permit of the free ingress and egress of air, and the piston rod or stem 9 is slidable through the head 8 and has a fork 10 threaded or otherwise secured upon its forward or outer end. The fork 10 straddles and is pivoted to the shank of the clutch pedal 1, or to any other suitable movable part of the clutch mechanism, whereby the piston rod 9 will be reciprocated when the clutch mechanism is operated.

The piston head 11 which works within the cylinder 3 and which is attached to the inner or rear end of the piston rod 9, comprises a pair of opposite leather or similar cups 12 mounted upon a reduced portion 13 adjacent the rear end of the piston rod 9. A metallic disk 14 is disposed between the cups 12 upon the reduced portion 13 of the piston rod 9, and clamping disks or plates 15 and 16 are mounted upon the said reduced portion 13 within the respective cups 12. The forward clamping disk 15 seats against a shoulder 17 provided by the reduced portion, while the rear clamping disk 16 is preferably threaded or otherwise secured upon the reduced portion 13 to clamp the cups 12 and spacing disk 14 between the clamping disks 15 and 16 to hold the piston head structure firmly upon the piston rod 9.

The piston head 11 is provided with an annular series of ports 18 therethrough, which are drilled through the cups 12, disk 14, and disks 15 and 16 adjacent the piston rod 9, and the ports 18 are normally closed by means of a spring pressed valve as will presently appear. The portion 13 of the piston rod is provided with a rearwardly projecting extension or stem 19, and a disk valve 20 is slidable upon the stem 19 and is provided with a conical extension 21 projecting rearwardly from the piston head and movable snugly upon the stem 19. A nut or other element 22 is threaded or otherwise engaged upon the rear or free end of the stem 19, and a spiral wire expansion spring 23 is disposed between the disk valve 20 and nut 22, the large end of the spring 23 bearing against the valve 20 while the small end bears against the nut 22. The spring 23 surrounds the conical extension 21 of the valve 20, whereby the said conical extension 21 will tend to hold the spring 23 in proper operative position. The valve 20 is provided with a leather, rubber, or other suitable facing 24 seatable against the rear clamping disk 16 to close the rear ends of the ports 18.

In practice, after the device has been properly installed, and the pet cock 7 closed, when the clutch pedal 1 is thrown forwardly to release the clutch, the piston rod 9 will be drawn forwardly with the shank of the clutch pedal, and the piston head 11 will consequently move forwardly within the cylinder 3. As the piston head 11 moves forwardly, the air in advance of the piston head 11 will pass through the piston head and into the chamber in rear of the piston head through the ports 18, the valve 20 unseating against the tension of the spring 23. Furthermore, the vent 8ª permits of the ready passage of air therethrough as the piston head reciprocates within the cylinder, whereby the present device will not hinder or impede the forward movement of the clutch pedal to release the clutch. When the clutch pedal 1 is released, to be returned to normal position under the influence of the clutch spring, to throw the clutch into engagement, the air in the cylinder 3 in rear of the piston head 11, will form a cushion, tending to prevent the quick engagement of the clutch, and thereby preventing the so-called "grabbing" which is detrimental. Due to the fact that the air in the cylinder 3 behind the piston head 11 is quite elastic and compressible, the clutch pedal 1 may be returned through a part of its stroke without difficulty, which will avoid the slow or lazy preliminary engagement of the clutch upon the initial movement of the clutch pedal, but the further movement of the clutch pedal is retarded or slackened by the air cushion as the air is compressed between the piston head 11 and the rear cylinder head 4. In this manner, the clutch will be gradually thrown into engagement, without the usual jerking action, and with but a slightly greater amount of time being consumed during the engagement of the clutch. The valve 20 seating against the disk 16 will close the ports 18 as the piston head moves rearwardly, to thereby avoid the escape of the air from the chamber in rear of the piston head.

From the foregoing, the advantages and capabilities of the present appliance will be obvious to those skilled in the art, it is thought, without further comment being deemed necessary.

Having thus described the invention, what is claimed as new is:—

A dash pot comprising a cylinder; a piston rod working through one end of the cylinder and having a reduced portion providing a shoulder, and a stem projecting from said reduced portion; a piston working within the cylinder and embodying a pair of leather cups upon said reduced portion, a disk between the cups, and clamping disks within the cups, one of the clamping disks seating against said shoulder and the other being threaded upon said reduced portion, the piston having an annular series of ports therethrough; a disk valve slidable upon the stem and having a conical extension projecting away from the piston and movable snugly upon the stem, said valve being seatable against the second mentioned clamping disk to close said ports; a nut threaded upon the free end of the stem; and a spiral expansion spring surrounding said conical extension and having its large end bearing against the valve and its small end bearing against said nut.

In testimony that I claim the foregoing as my own, I have hereto affixed my signature in the presence of two witnesses.

HARRY REDLICH.

Witnesses:
H. H. CLAY,
GEORGE HOUSE.